United States Patent
Nakamura

(10) Patent No.: US 6,829,670 B1
(45) Date of Patent: Dec. 7, 2004

(54) USING CONSECUTIVE BLOCK IDS TO KEEP TRACK OF DATA TRANSFERRED ACROSS A SERIALLY LINKED BRIDGE

(75) Inventor: Nobutaka Nakamura, Hidaka (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 550 days.

(21) Appl. No.: 09/702,755

(22) Filed: Nov. 1, 2000

(30) Foreign Application Priority Data

Nov. 17, 1999 (JP) .......................................... 11-327178

(51) Int. Cl.$^7$ ............................ G06F 13/36; H04L 1/00; G08C 25/02
(52) U.S. Cl. ........................ 710/310; 370/235; 370/394; 714/748
(58) Field of Search ................................ 710/305–315; 370/224–253, 394, 473; 709/230–237; 744/748–751, 43, 56

(56) References Cited

U.S. PATENT DOCUMENTS

| | | | |
|---|---|---|---|
| 4,144,522 A | * 3/1979 | Kageyama et al. | 714/748 |
| 4,344,171 A | * 8/1982 | Lin et al. | 714/751 |
| 4,422,171 A | * 12/1983 | Wortley et al. | 714/748 |
| 4,617,657 A | * 10/1986 | Drynan et al. | 370/394 |
| 4,726,027 A | * 2/1988 | Nakamura et al. | 714/748 |
| 4,839,891 A | * 6/1989 | Kobayashi et al. | 370/231 |
| 4,970,714 A | * 11/1990 | Chen et al. | 370/216 |
| 5,007,051 A | * 4/1991 | Dolkas et al. | 370/235 |
| 5,136,576 A | * 8/1992 | Brownlie | 370/286 |
| 5,313,473 A | * 5/1994 | Darmon et al. | 714/751 |
| 5,444,718 A | 8/1995 | Ejzak et al. | 371/32 |
| 5,477,550 A | * 12/1995 | Crisler et al. | 714/748 |
| 5,524,218 A | * 6/1996 | Byers et al. | 710/305 |
| 5,629,948 A | * 5/1997 | Hagiwara et al. | 714/748 |
| 5,699,369 A | * 12/1997 | Guha | 714/774 |
| 5,734,659 A | * 3/1998 | Mann et al. | 370/474 |
| 5,745,685 A | * 4/1998 | Kirchner et al. | 709/237 |
| 5,751,719 A | * 5/1998 | Chen et al. | 370/473 |
| 5,754,754 A | * 5/1998 | Dudley et al. | 714/18 |
| 5,828,677 A | * 10/1998 | Sayeed et al. | 714/774 |
| 5,838,913 A | * 11/1998 | Lysejko et al. | 709/208 |
| 5,892,894 A | * 4/1999 | Shiroshita et al. | 714/4 |
| 5,930,233 A | * 7/1999 | Kanerva et al. | 370/231 |
| 5,931,916 A | * 8/1999 | Barker et al. | 709/239 |
| 5,974,028 A | * 10/1999 | Ramakrishnan | 370/229 |
| 6,021,124 A | * 2/2000 | Haartsen | 370/336 |
| 6,069,886 A | * 5/2000 | Ayerst et al. | 370/336 |
| 6,091,733 A | * 7/2000 | Takagi et al. | 370/401 |
| 6,175,560 B1 | * 1/2001 | Bhagalia et al. | 370/342 |
| 6,181,704 B1 | * 1/2001 | Drottar et al. | 370/410 |
| 6,233,248 B1 | * 5/2001 | Sautter et al. | 370/465 |
| 6,292,470 B1 | * 9/2001 | Uota | 370/252 |
| 6,301,249 B1 | * 10/2001 | Mansfield et al. | 370/394 |
| 6,330,699 B1 | * 12/2001 | Yoshioka et al. | 714/746 |
| 6,335,933 B1 | * 1/2002 | Mallory | 370/394 |
| 6,389,016 B1 | * 5/2002 | Sabaa et al. | 370/389 |
| 6,411,621 B1 | * 6/2002 | Norton et al. | 370/394 |
| 6,425,105 B1 | * 7/2002 | Piirainen et al. | 714/748 |

(List continued on next page.)

*Primary Examiner*—Sumati Lefkowitz
(74) *Attorney, Agent, or Firm*—Finnegan, Henderson, Farabow, Garrett & Dunner, L.L.P.

(57) ABSTRACT

A PCI-PCI bridge is composed of two physically different controllers, i.e., a primary PCI serial transfer controller arranged at a PC, and a secondary PCI serial transfer controller arranged at a docking station. In data transfer between these controllers, preliminary transmission of block data having a block ID assigned thereto and a return of ACK having the block ID assigned thereto are performed asynchronously. The transmission party can determine which data item is the last the receiving party has received by employing a block ID assigned to NAK. When NAK is received from the receiving party, re-transmission from a block waiting for NAK is started. In this manner, data required to transmit a bus transaction between buses can be transferred accurately and speedily between two controllers.

10 Claims, 10 Drawing Sheets

U.S. PATENT DOCUMENTS

| | | | |
|---|---|---|---|
| 6,438,105 B1 * | 8/2002 | Qarni et al. | 370/231 |
| 6,473,425 B1 * | 10/2002 | Bellaton et al. | 370/392 |
| 6,487,689 B1 * | 11/2002 | Chuah | 714/748 |
| 6,496,481 B1 * | 12/2002 | Wu et al. | 370/242 |
| 6,563,826 B1 * | 5/2003 | Shikama | 370/394 |
| 6,574,668 B1 * | 6/2003 | Gubbi et al. | 709/237 |
| 6,621,796 B1 * | 9/2003 | Miklos | 370/236 |
| 6,658,619 B1 * | 12/2003 | Chen | 714/748 |
| 6,662,330 B1 * | 12/2003 | Hershey | 714/748 |
| 2003/0002502 A1 * | 1/2003 | Gibson et al. | 370/389 |

* cited by examiner

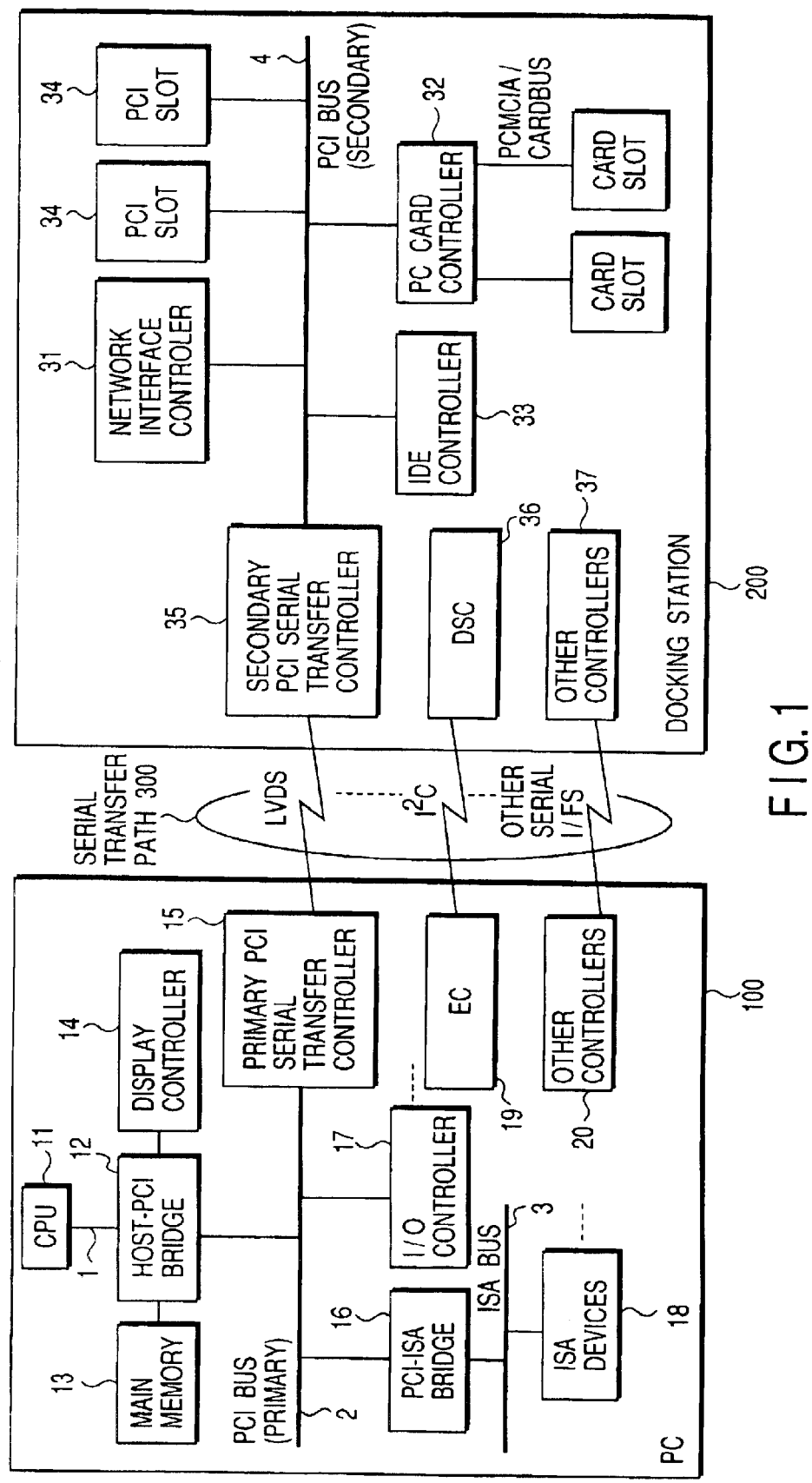
F I G. 1

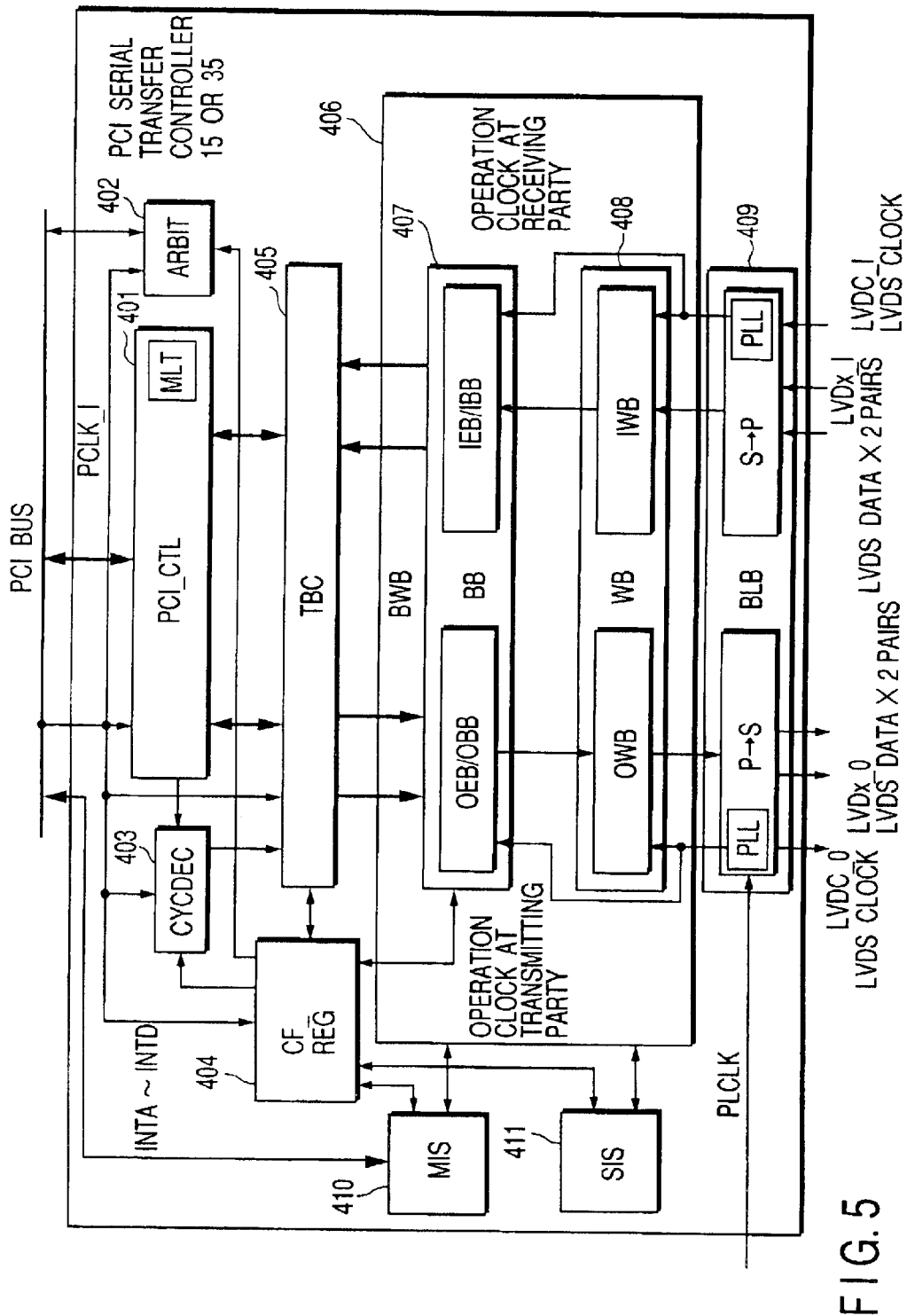
F I G. 5

OBB STATE TRANSITION

BLOCK TRANSFER & RE-TRANSMISSION CONTROL (EXAMPLE 1)

US 6,829,670 B1

USING CONSECUTIVE BLOCK IDS TO KEEP TRACK OF DATA TRANSFERRED ACROSS A SERIALLY LINKED BRIDGE

CROSS-REFERENCE TO RELATED APPLICATIONS

This application is based upon and claims the benefit of priority from the prior Japanese Patent Application No. 11-327178, filed Nov. 17, 1999, the entire contents of which are incorporated herein by reference.

BACKGROUND OF THE INVENTION

The present invention relates to a computer system and a data transfer control method. In particular, the present invention relates to an improved computer system and an improved data transfer control method so that data required to transmit a bus transaction can be transferred accurately and speedily.

In recent years, there has been developed a variety of personal computers (hereinafter, referred to as a notebook type PC) that can be easily portable and operable by batteries. Some notebook type PCs are configured so that these PCs can be attached to an expansion unit in order to ensure their functional expansion as required. In order to ensure that a resource of an expansion unit can be efficiently used from a notebook type PC, it is essential to connect a bus of the notebook type PC to a bus in the expansion unit. By this bus connection, a device on the bus in the expansion unit can be handled in the same way as the device in the notebook type PC.

In many personal computers, a PCI (Peripheral Component Interconnect) bus is used. Therefore, it is general that bus connection between the notebook type PC and the expansion unit is made by providing docking connectors having a large number of pins corresponding to the number of signal lines included in the PCI bus on the notebook type PC side and the expansion unit side, respectively, and then, physically connecting both PCI buses via the docking connectors.

However, in this configuration, a large area is required for mounting a docking connector, which is disadvantageous in achieving small sized and thinner notebook type PC. Further, connector mount positions of the notebook type PC side and the expansion unit side must be aligned with another, restriction will apply to a physical cabinet structure in carrying out new product development.

Recently, there has been proposed by the Applicant a technique in which a PCI-PCI bridge for making connection between a PCI bus on the notebook type PC side and a PCI bus on the expansion unit side is composed of two controllers, i.e., first and second controllers that are physically different from each other, and transmission of information between these controllers is performed through serial transmission (Japanese Patent Application No. 11-183919 and U.S. patent application Ser. No. (not assigned yet) filed on Jun. 28, 2000). In this case, the two controllers, i.e., the first and second controllers are disposed separately on the notebook type PC side and expansion unit side. Data required to transmit a bus transaction from the PCI bus on the notebook type PC side to the PCI bus on the expansion unit side is transmitted to the second controller via a serial transmission path such as a cable after being converted from parallel data into serial data at the first controller. In the second controller, conversion from serial data into parallel data is performed, and a bus transaction is executed on the PCI bus on the expansion unit side. In this manner, the notebook type PC and the expansion unit can be connected to each other via a thin cable with its small number of signal lines.

However, in the case where a single PCI-PCI bridge is composed of two controllers, i.e., the first and second controllers that are physically different from each other, it is required to ensure data transfer between these two controllers in order to maintain reliability in system operation. Further, a data transfer speed between these two controllers greatly influences throughput of the entire system. Hence, implementation of a new flow control for transmitting data required to transmit a bus transaction accurately and speedily between two controllers is required.

Many of the data transfers in the fields of computer or communication are performed by employing a handshake. If a receiving party detects an error, it transmits NACK (Negative ACK) to a transmitting party. If the transmitting party receives NACK, it performs a re-transmission processing. If the receiving party receives data correctly, it transmits ACK (Acknowledgment) to the transmitting party. If the transmitting party receives ACK, it goes to the next data transmission processing. However, in such system, although its implementation is easy, it is difficult to obtain a sufficient communication speed be aware of the nature of the handshake process.

BRIEF SUMMARY OF THE INVENTION

Accordingly, it is an object of the present invention to provide a computer system and a data transfer control method in which a new flow control is implemented such that data required to transmit a bus transaction between buses can be transmitted accurately and speedily between two controllers, thereby ensuring sufficient throughput and improvement of operation.

According to the present invention, there is provided a computer system for transferring data required to transmit a bus transaction between first and second controllers, the computer system comprising: data transmitting means for assigning consecutive IDs to a plurality of data targeted for transmission, respectively, thereby sequentially transmitting a plurality of these data from a transmitting controller to a receiving controller without waiting for return of a response from the receiving party; response transmitting means for, each time data is received correctly, transmitting the response to which the same ID as that of the received data has been assigned, from the receiving controller to the transmitting controller; and means for managing whether or not the response is returned from the receiving controller for each transmitted data, and, when a re-transmission request is received from the receiving controller, for re-transmitting data for which the response is not received from the receiving controller in order of IDS.

In this computer system, a consecutive ID is assigned to data at the transmitting controller, and is transmitted to the receiving controller. In this case, there is no need to wait for a response from the receiving controller every data transmission, and a plurality of data are transmitted to the receiving controller sequentially irrespective of the response. The receiving controller basically returns a response to the transmitting party every correct data reception. In this case, an ID corresponding to the received data is assigned to such response. This is because return of the response can be executed asynchronously with data transmission from the transmitting party. Hence, the transmitting party can perform next data transmission without waiting for a response from the receiving party.

Further, the transmitting party can recognize whether or not the response is returned from the receiving controller by each transmitted data by employing an ID assigned to the response. Thus, as in a general handshake, whether or not the data is correctly received can be known for individual data. In addition, the transmitting party can determine which data item is the last the receiving party has received. Thus, for example, the case where the receiving party cannot receive data due to a buffer overflow on the receiving buffer, data that is not received can be re-transmitted. Hence, improvement in communication speed can be made compatible with improvement in reliability.

Hence, a mechanism of the above flow control is applied to two physically different controllers that configure a bus bridge, thereby making it possible to transfer data required to transmit a bus transaction speedily and accurately. Serial connection between a host device and an expansion unit can be achieved while a bus bridge maintains its operational reliability and performance.

At the transmitting party, even after the data is transmitted, the transmitted data may be managed as data waiting for a response until the corresponding response has been received.

In addition, the computer system according to the present invention further comprises error recovery means for, when an error occurs during data transfer between the first and second controllers, executing transmission and reception of a predetermined bit pattern between the first and second controllers, thereby reestablishing synchronization of a communication path between the first and second controllers, notifying to the transmitting controller an ID of the data from which transmission is to be restarted and which is next to the data which was correctly received last, and thereafter, recovering the first and second controllers in a normal operation state, wherein, in the case where these controllers are recovered in such normal operation state, the data transmitting means restarts transmission processing from the data of which ID was notified from the receiving controller.

In this manner, during error detection, as during initialization, it becomes possible to ensure recovery from a variety of errors by restarting from reestablishment of synchronization of the communication path. Further, during error recovery processing, an ID of the received data is notified from the receiving party to the transmitting party in order to eliminate logical discontinuity between the controllers. In this manner, after error recovery, the data transmitting means on the transmitting party can restart transmission processing correctly from the next data of the received data notified from the receiving controller. The receiving party does not necessitate to formally transmit acknowledgement to the transmitting party.

As described previously, a sequential ID is assigned to a response as well as the data, and thus, error detection can be easily performed by checking continuity of the ID of the response from the receiving party.

In addition, the computer system of the present invention is directed to a computer system for exchanging data required to transmit a bus transaction between the first and second controllers, the computer system comprising data transmitting means for assigning consecutive IDs to data waiting for transmission respectively, thereby consecutively transmitting a plurality of predetermined data items from a transmitting controller to a receiving controller without waiting for a return of a response from the receiving party; response transmitting means for transmitting a response to which the same ID as that of the received data has been assigned, from the receiving controller to the transmitting controller; and means for managing whether or not a response is returned from the receiving controller, and causing the data transmitting means to repeatedly execute consecutive transmission processing in units of the plurality of data items including data waiting for the response so as to repeatedly transmit data waiting for the response.

In this computer system, consecutive transmission processing is repeatedly executed in units of a plurality of data items including data waiting for a return of a response as well as data waiting for transmission. Because of this, the receiving party may receive data at its own timing. Even if a re-transmission request is not made, the receiving party can receive data at an arbitrary timing. Hence, although throughput is somewhat reduced, a control for re-transmission processing is eliminated, and simplified control can be achieved. Of course, data for which a response is received is excluded from a transmission target, and instead, even if data waiting for transmission is present, such data may be transmitted.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a block diagram showing a configuration of a computer system according to one embodiment of the present invention;

FIG. 5 is a block diagram showing a specific hardware structure of the primary PCI serial transfer controller and the secondary PCI transfer controller used in the present embodiment;

DETAILED DESCRIPTION OF THE INVENTION

Figure 2:
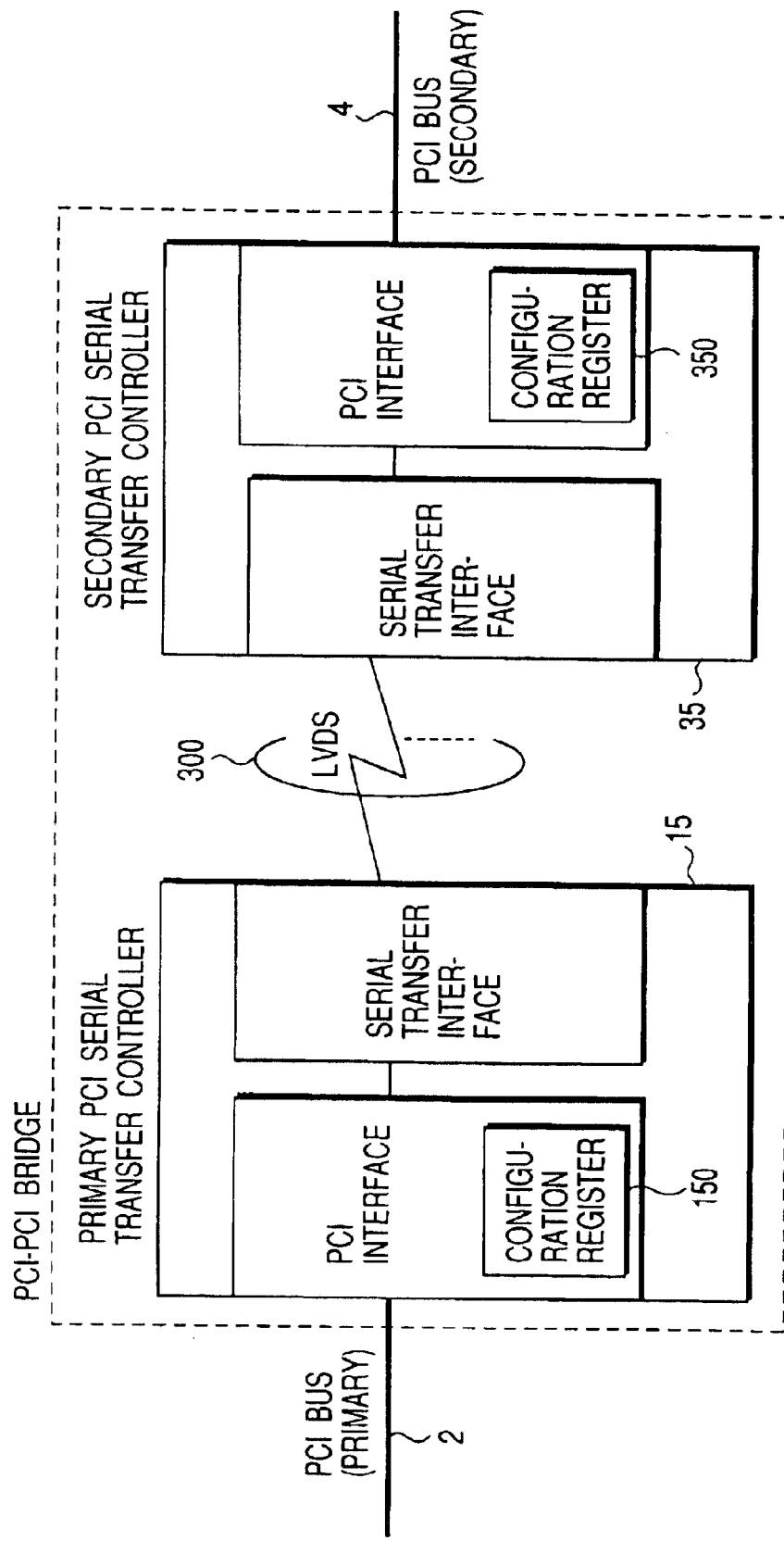
FIG. 2 is a block diagram showing a configuration of a PCI-PCI bridge used in the present embodiment.

A preferred embodiment of a computer system according to the present invention will now be described with reference to the accompanying drawings.

FIG. 1 shows the arrangement of a computer system according to the embodiment of the present invention. This computer system is a notebook type personal computer (PC) system and comprises a notebook type PC 100 and a docking station 200 for expanding function of the PC 10, which can be used after it is connected to the PC 100 through a cable. The signal lines in the, cable is comprised of a serial transfer path 300, as shown in FIG. 1. The serial transfer path 300 comprises an LVDS (Low Voltage Differential Signaling) line, I²C (Inter Integrated Circuit) bus, and other serial control signal lines.

The LVDS line is a serial transmission path that is used to serially connect a PCI bus (primary PCI bus) 2 in the PC 100 to a PCI bus (secondary PCI bus) 4 in the docking station 200. Bus transactions are exchanged between the PCI bus 2 in the PC 100 and the PCI bus 4 in the docking station 200 by high-speed bit serial signal transfer through this serial transmission path.

As shown in FIG. 1, the PC 100 comprises a processor bus 1, PCI bus 2, ISA (Industry Standard Architecture) bus 3, CPU 11, host-PCI bridge 12, main memory 13, display controller 14, primary PCI serial transfer controller 15, PCI-ISA bridge 16, I/O controllers 17, various ISA devices 18, EC (Embedded Controller) 19, various other controllers 20, and the like.

The CPU 11 controls the overall operation of this PC system and executes the operating system, system BIOS, and various other programs loaded into the main memory 13. The host-PCI bridge 12 is a bridge device for bidirectionally connecting the processor bus 1 to the primary PCI bus 2. The host-PCI bridge 12 incorporates a memory control logic for access control on the main memory 13 and a control logic for an AGP (Accelerated Graphics Port) that is used for connection to the display controller 14. The host-PCI bridge 12 can function as a bus master on the primary PCI bus 2. The main memory 13 stores, for example, the operating system, application programs/utility programs to be processed, and user data generated by application programs and the like.

The primary PCI serial transfer controller 15 logically forms one PCI-PCI bridge device in cooperation with a secondary PCI serial transfer controller 35 implemented in the docking station 200. This PCI-PCI bridge device serves to bidirectionally connect the PCI bus 2 in the PC 100 to the PCI bus 4 in the docking station 200. The PCI-PCI bridge device allows a device on the primary PCI bus 2 to access a device on the secondary PCI bus 4, and vice versa. The PCI bus 2, which is closer to the host side from the viewpoint of the PCI-PCI bridge device, serves as the primary PCI bus of the PCI-PCI bridge device, whereas the PCI bus 4, which is farther from the host side, serves as the secondary PCI bus of the PCI-PCI bridge device. In this embodiment, therefore, the PCI-PCI bridge device that connects the primary PCI bus 2 to the secondary PCI bus 4 is divided into two physically isolated controllers (the primary PCI serial transfer controller 15 and secondary PCI serial transfer controller 35), and two controllers are connected to each other through LVDS lines, thereby realizing a PCI serial interface.

The PCI-ISA bridge 16 is a bridge for connecting the primary PCI bus 2 to the ISA bus 3. Various ISA devices 18 are connected to the ISA bus 3. The I/O controllers 17 are devices functioning as bus masters or targets on the primary PCI bus 2. Devices such as a PC card controller, IDE (Integrated Drive Electronics) controller, and sound controller are connected as the I/O controllers 17 to the primary PCI bus 2.

The EC (Embedded Controller) 19 controls the power management of the PC 100 and also controls a docking/undocking sequence for the docking station 200 by communicating with a DSC (Docking Station Controller) 36 implemented in the docking station 200.

As shown in FIG. 1, the docking station 200 incorporates the secondary PCI bus 4, a network interface controller 31, a PC card controller 32, an IDE controller 33, PCI slots 34, the secondary PCI serial transfer controller 35, the DSC (Docking Station Controller) 36, other controllers 37, and the like.

The network interface controller 31 performs communication control for connection to a LAN, and serves as a bus master or target on the secondary PCI bus 4. The PC card controller 32 controls a PC card complying with the PCM-CIA (Personal Computer Memory Card International Association)/CardBus specifications and inserted into a PC card slot. The PC card controller 32 also serves as a bus master or target on the secondary PCI bus 4. The IDE controller 33 controls IDE devices such as a hard disk drive and CD-ROM drive installed in the docking station 200, and serves as a bus master or target on the secondary PCI bus 4. Various PCI expansion cards can be inserted into the PCI slots 34.

When the PC 100 is connected to the docking station 200, these PCI devices such as the network interface controller 31, PC card controller 32, IDE controller 33, and PCI expansion cards of PCI slots 34 can be used as hardware resources in the PC 100.

PCI-PCI Bridge

FIG. 2 shows the functional arrangements of the primary PCI serial transfer controller 15 and secondary PCI serial transfer controller 35.

As described above, although the primary PCI serial transfer controller 15 and secondary PCI serial transfer controller 35 are physically independent LSIs, they function as one PCI-PCI bridge logically. For this reason, the LVDS line connecting the primary PCI serial transfer controller 15 to the secondary PCI serial transfer controller 35 is just a local internal wiring inside the PCI-PCI bridge and is not recognized by software. This means that no unnecessary resource is assigned to the serial transmission path. Since the primary PCI serial transfer controller 15 and secondary PCI serial transfer controller 35 share the configuration address space assigned by one device identification (IDSEL) signal, they are recognized as one device by software. Since two controllers, i.e., the primary PCI serial transfer controller 15 and secondary PCI serial transfer controller 35, are recognized as one device, only the primary PCI serial transfer controller 15 may have device identification information.

Each of the primary PCI serial transfer controller 15 and secondary PCI serial transfer controller 35 comprises a PCI interface section and serial transfer interface section.

In the primary PCI serial transfer controller 15, the PCI interface section exchanges bus transactions with the primary PCI bus 2. In the secondary PCI serial transfer controller 35, the PCI interface section exchanges bus transactions with the secondary PCI bus 4. The PCI interface sections exchange bus transactions with each other by serial data transfer between serial transfer interface sections respectively implemented in the primary PCI serial transfer controller 15 and the secondary PCI serial transfer controller 35.

A PCI bus is a parallel transmission path including address/data lines having a width of a plurality of bits, and the like. A bus transaction on the PCI bus is basically constituted by an address phase for outputting a command and an address, and one or more data transfer phases following the address phase. If, therefore, the respective PCI interface sections exchange the commands, addresses, and data between the corresponding PCI buses by serial transfer between the respective serial transfer interface sections, transactions can be transferred from the primary PCI bus 2 to the secondary PCI bus 4, and vice versa.

When a bus transaction is transmitted from a bus master on the primary PCI bus 2 to a device on the secondary PCI bus 4, the primary PCI serial transfer controller 15 becomes a target for the bus transaction being executed on the primary PCI bus 2, and the secondary PCI serial transfer controller 35 becomes an initiator (bus master) for the bus transaction to be executed on the secondary PCI bus 4. When a bus transaction is transmitted from a bus master on the secondary PCI bus 4 to a device on the primary PCI bus 2, the secondary PCI serial transfer controller 35 becomes a target for the bus transaction being executed on the secondary PCI bus 4, and the primary PCI serial transfer controller 15 becomes an initiator for the bus transaction to be executed on the primary PCI bus 2. Note that if no bus master device is present on the secondary PCI bus 4, only the former case holds.

As shown in FIG. 2, configuration registers 150 and 350 are separately implemented in the PCI interface sections of the primary PCI serial transfer controller 15 and secondary PCI serial transfer controller 35. Each of the configuration registers 150 and 350 comprises a register group complying with the PCI specifications. In these registers, identical pieces of environmental setting information are set.

Environmental setting information includes the above-mentioned device identification information, device control information for designating hardware resources such as a memory address space and I/O address space which the device is to use, device status information indicating the current status of the device, and the like.

Device identification information is used to identify the type of device, and comprises information such as a device ID, vendor ID, revision ID, header type, and class code. The device identification information is read-only information. Identical pieces of device identification information are written in the configuration registers 150 and 350. Obviously, this read-only device identification information may be prepared in only the primary PCI serial transfer controller 15 closer to the CPU 11, but need not be prepared in the secondary PCI serial transfer controller 35. This is because, in a configuration cycle, the CPU 11 accesses only the primary PCI serial transfer controller 15 and recognizes the existence of a PCI-PCI bridge between the primary PCI bus 2 and the secondary PCI bus 4 by reading the device identification information from the primary PCI serial transfer controller 15.

A configuration register serves to hold environmental setting information for defining an operation environment for a PCI device. One configuration register is implemented in each PCI device. If the primary PCI serial transfer controller 15 and secondary PCI serial transfer controller 35 operate as one PCI device (PCI-PCI bridge), the controllers 15 and 35 can basically share one configuration register, as described above. If, however, a configuration register is implemented in only one controller in this manner, the other controller having no configuration register must read the configuration register in one controller through a serial transmission path for every bus transaction processing. This may cause degradation in system performance. Since configuration registers are separately implemented in two controllers 15 and 35 as in this embodiment, two controllers 15 and 35 can operate in accordance with the pieces of environmental setting information respectively set in their configuration registers. This makes it possible to realize high-speed operation. In this case, each of two controllers 15 and 35 includes most register groups (a register group for setting device control information, a register group for setting device status information indicating the current status of the device, and the like) except for a register for setting read-only device identification information.

The identity of the contents of the configuration registers 150 and 350 is realized by automatically executing the following copying operation between the primary PCI serial transfer controller 15 and the secondary PCI serial transfer controller 35. When the CPU 11 executes a write transaction (configuration write cycle) to write data in the configuration register 150, copying operation is automatically executed from the configuration register 150 to the configuration register 350. Thereafter, a status indicting the completion of a write is returned to the CPU 11. This makes it possible to always keep the contents of the configuration registers 150 and 350 identical.

Internal Arrangements of Two PCI Serial Transfer Controllers

Figure 3:
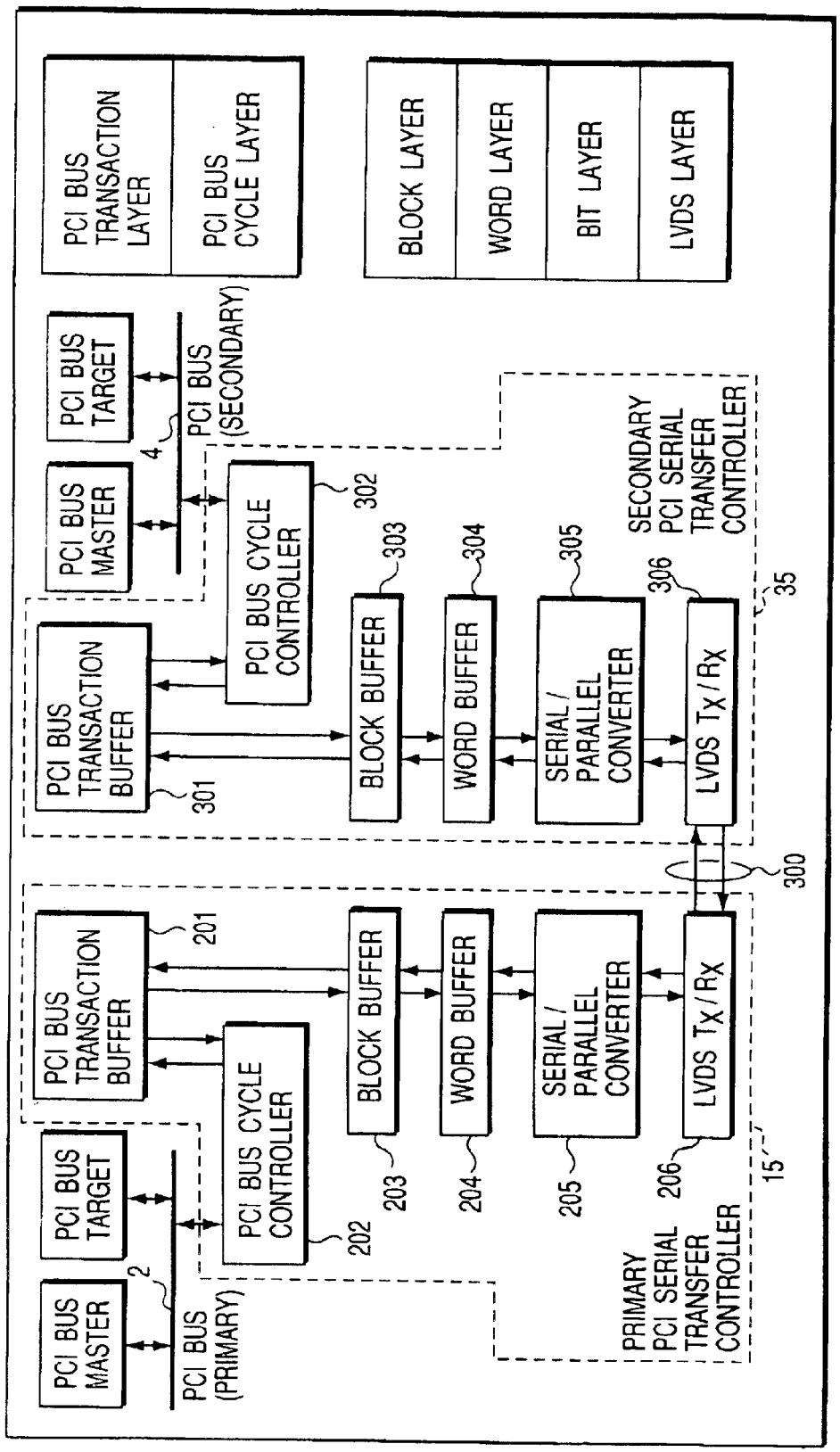
FIG. 3 is a block diagram showing an internal structure of a primary PCI serial transfer controller and a secondary PCI serial transfer controller used in the present embodiment.

The internal structures of the primary PCI serial transfer controller 15 and secondary PCI serial transfer controller 35 will be descried with reference to FIG. 3, with consideration given to logical protocol hierarchical structures.

As shown in FIG. 3, the primary PCI serial transfer controller 15 comprises a PCI bus transaction buffer 201, PCI bus cycle controller 202, block transfer buffer 203, word transfer buffer 204, serial/parallel converter 205, and LVDS transmission/reception section 206.

The PCI bus transaction buffer 201 and PCI bus cycle controller 202 correspond to the above-mentioned PCI interface section. The block transfer buffer 203, word transfer buffer 204, serial/parallel converter 205, and LVDS transmission/reception section 206 correspond to the above-mentioned serial transfer interface section.

Likewise, as shown in FIG. 3, the secondary PCI serial transfer controller 35 comprises a PCI bus transaction buffer 301, PCI bus cycle controller 302, block transfer buffer 303, word transfer buffer 304, serial/parallel converter 305, and LVDS transmission/reception section 306. The PCI bus transaction buffer 301 and PCI bus cycle controller 302 correspond to the abovementioned PCI interface section. The block transfer buffer 303, word transfer buffer 304, serial/parallel converter 305, and LVDS transmission/reception section 306 correspond to the above-mentioned serial transfer interface section.

The right end of FIG. 3 shows a protocol hierarchical structure for implementing a PCI serial interface in this embodiment. The top layer is a PCI bus transaction layer, and a PCI bus cycle layer follows, which is used to control a bus cycle required to actually execute a bus transaction.

The section implemented by integrating the sections above the bus cycle layer, including the left and right halves, i.e., the section implemented by integrating the bus transaction buffers 201 and 301 and bus cycle controllers 202 and 302, corresponds to a general PCI-PCI bridge.

The layers shown on the lower half of FIG. 3 correspond to a section for performing serial communication between the primary PCI serial transfer controller 15 and the secondary PCI serial transfer controller 35.

The layers shown on the upper half are designed in accordance with a PCI bus protocol, whereas the layers shown on the lower half are optimally designed to faithfully send data transferred on the PCI bus to the other party. There is no need to consider what meaning each data of a block to be transferred has on the PCI bus. It suffices if the block is correctly assigned transfer characteristics suitable for the meaning which the data transferred over the PCI bus has and if these transfer characteristics are implemented. That is, a concept similar to packet communication in the field of communication can be used.

A word in FIG. 3 corresponds to a fixed-length packet, and a block is a transfer unit including one control word and 0 to 10 data words.

The meaning of each buffer will be described below.

The bus transaction buffers 201 and 301 are buffers for managing a PCI bus cycle as a bus transaction, and are used to mediate between a PCI bus cycle and block transfer as described later. The following are pieces of information constituting a bus transaction, although they slightly vary depending on the type of transaction:

Address
Command
Write data (write transaction)
Byte enable
Completion status
Read data (read transaction)

These pieces of information are held in the bus transaction buffers 201 and 301.

The block transfer buffers (BLOCK) 203 and 303 are temporary information storage devices for transferring variable-length data called blocks altogether between two serial controllers 15 and 35. The block size is variable. Each block is basically constituted by pieces of information such as an address, data, command, and byte enables. Plural blocks constitute one transaction.

The word transfer buffers 204 and 304 are temporary information storage devices for transferring fixed-length data called words one by one between two serial controllers 15 and 35. The word includes a control word and a data word. The substantial portion (PCI transaction information: address, command, data, byte enable, and the like) of each block is exchanged as the data word, and the remaining portion is exchanged as the control word.

The serial/parallel converters 205 and 305 perform parallel/serial conversion and serial/parallel conversion in units of words. The LVDS transmission/reception section 206 and 306 perform actual serial data transfer through LVDS lines.

Buffer Structure

Now, a specific buffer structure will be described with reference to FIG. 4.

Two types of block buffers listed below are provided depending on a kind of PCI bus transactions to be handled.

Express buffer (posted memory write transaction)
BLOCK buffer (for other transactions)

In addition, two types of block buffers listed below are provided depending on a data flow.

Outgoing buffer (for storing information on blocks to be transmitted)
Incoming buffer (for storing information on received blocks)

A total of four types of buffers listed below are provided in combination with these buffers.

Outgoing Express buffer (OEB)
Outgoing BLOCK buffer (OBB)
Incoming Express buffer (IEB)
Incoming BLOCK buffer (IBB)

In the present embodiment, in order to ensure system performance, these OBB, OEB, IBB, and IEB buffers are provided by four stages. This means that four types of block buffer FIFOs, namely, OBB_FIFO, OEB_FIFO, IBB_FIFO, and IEB_FIFO are provided.

Figure 4:
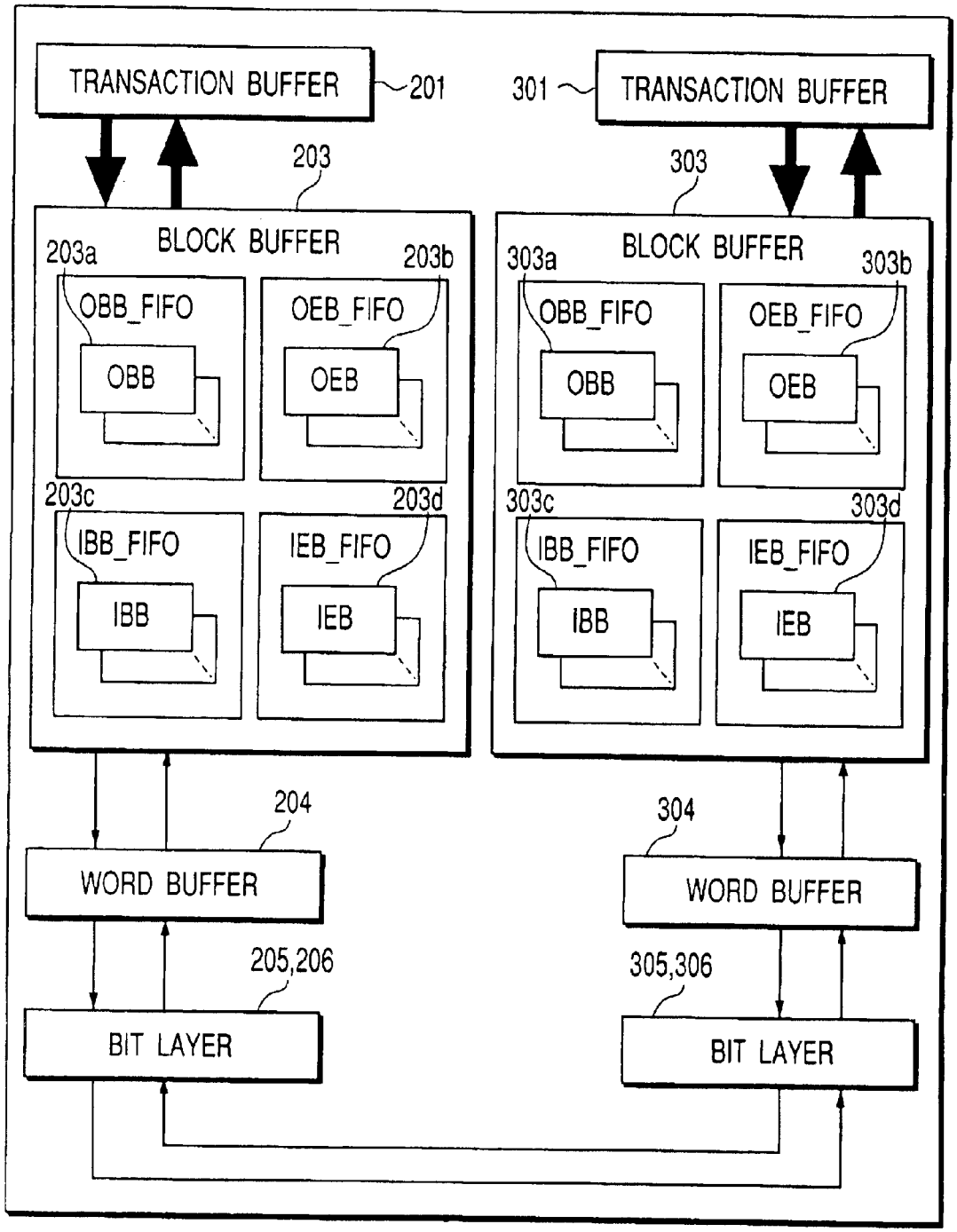
FIG. 4 is a view showing a buffer structure in the primary PCI serial transfer controller and the secondary PCI transfer controller used in the present embodiment.

That is, as shown in FIG. 4, in a block transfer buffer 203, there are provided OBB_FIFO composed of a four-stage Outgoing BLOCK buffer (OBB) 203a; OEB_FIFO composed of a four-stage Outgoing Express buffer (OEB) 203b; IBB_FIFO composed of a four-stage Incoming BLOCK buffer (IBB) 203c; and IEB_FIFO composed of a four-stage Incoming Express buffer (IEB) 203d. Similarly, at a block transfer buffer 303 as well, there are provided OBB_FIFO composed of a four-stage Outgoing BLOCK buffer (OBB) 303a; an OEB_FIFO composed of a four-stage Outgoing Express buffer (OEB) 303b; IBB_FIFO composed of a four-stage Incoming Block buffer (IBB) 303c; and IEB_FIFO composed of a four-stage Incoming Express buffer (IEB) 303d.

As described previously, a block is a set of words having its own structure. A block is composed of the following three parts. Transmission and reception are processed in the following order with an elapse of time.

One control word
A plurality of data words (0 to 10 data words)
One checksum word A word is a set of bits. This word is roughly divided into a control word indicating control information and a data word indicating data. In block buffers 203 and 203, each word configuring blocks is handled as a unit of 17 bits listed below.

The real size of the information on each word configuring blocks is 16 bits; and
A field for discriminating the control word from the data word is 1 bit.

The block buffers 203 and 203 perform data exchange in units of 17-bit words with a lower processing hierarchy. The lower processing hierarchy corresponds to the aforementioned word transfer buffers and a bit layer. The bit layer corresponds to serial/parallel converters 205 and 305 shown in FIG. 3 and LVDS transmitting and receivers 206 and 306. The following processing is directed to processing performed in the lower processing hierarchy, and the block buffers 203 and 203 do not perform such processing.

Word buffer: A 1-bit parity is added to each 17-bit word that the block buffers handle, and 18-bit data is generated.

Bit hierarchy: The 18-bit data is converted from parallel data to serial data, and is serially transferred at a high speed. Actually, two transmission LVDS lines and two reception LVDS lines are provided at each of the controllers 15 and 35. Thus, the 18-bit data is decomposed into 9 bits×two streams, each of which is serially transferred simultaneously after being converted from parallel data into serial data.

The receiving party conforms to the reversed process.

Block Transfer

As described previously, in the present embodiment, although serial transfer is performed in the lower hierarchy, data transfer (block transfer) is executed in units of blocks between the block buffers 203 and 203. This block transfer is performed in order to service a request from transaction buffers 201 and 301. An object of the block transfer is to accurately and speedily transfer information delivered from the bus transaction buffer to a bus transaction buffer of the counterpart PCI serial transfer controller. In order to achieve this object, the following information is added to a block targeted for transmission in the block buffer hierarchy.

Block ID for block identification (to be transferred after being embedded in the control word)

Checksum word (a kind of control word)

A block ID of a consecutive value is assigned to each of block data targeted for transmission. Ideally, a value of 0 to infinitive maximum is assigned sequentially as a block ID. However, a limited number of bits can be actually used. In the present embodiment, a 3-bit block ID is provided, and 0 to 7 are repeatedly assigned in order.

Internal Structure of Two PCI Serial Transfer Controller

Now, an internal configuration of the primary PCI serial transfer controller 15 and the secondary PCI serial transfer controller 35 will be described with reference to FIG. 5.

The configuration of the primary PCI serial transfer controller 15 is basically identical to that of the secondary PCI serial transfer controller 35. Each of these controllers is composed of: a PCI bus control block (PCI_CTL) 401; a PCI bus arbitration block (ARBIT) 402; a cycle decode block (CYCDEC) 403; a configuration register block (CF_REG) 404; a bus transaction buffer & control block (TBC) 405; a block & word buffer block (BWB) 406; a block transfer buffer block (BB) 407; a word transfer buffer block (WB) 408; a bit layer block (BLB) 409; a miscellaneous (Misc) information update block (MIS) 410; and a serial interrupt synchronization block (SIS) 411, as illustrated.

The PCI control block (PCI_CTL) 401 is adopted to control a PCI bus interface as a PCI bus master and a target, and comprises a master latency timer MLT. The master latency timer MLT is adopted to clock a timing for canceling a current bus cycle relevant to a bus master that is executing such cycle. During target operation, the PCI bus control block (PCI_CTL) 401 operates by triggering a hit signal from the cycle decode block (CYCDEC) 403. That is, when the PCI bus control block (PCI_CTL) 401 receives a hit signal, it starts a PCI bus cycle as a target in response to a PCI bus cycle to be performed by a current bus master on the PCI bus.

The PCI bus arbitration block (ARBIT) 402 is an arbiter for performing arbitration of the PCI bus master on the PCI bus.

The cycle decode block (CYCDEC) 403 decodes a PCI bus cycle type and address, and performs hit judgment during PCI bus target operation. In addition, this cycle decode block (CYCDEC) 403 generates a cycle start signal for the bus transaction buffer & control block (TBC) 405 and a hit signal for the PCI bus control block (PCI_CTL) 401.

The configuration register block (CF_REG) 404 is a PCI configuration register described previously.

The transaction buffer & control block (TBC) 405 is a buffer that manages a PCI bus cycle as a bus transaction, and data transmission is controlled between the block transfer buffer block (BB) 407 and the PCI bus control block (PCI_CTL) 401.

The block & word buffer block (BWB) 406 conveniently combines the block transfer buffer block (BB) 407 composed of the aforementioned block transfer buffer and its control logic, and the word buffer block (WB) 408 composed of the aforementioned word transfer buffer and its control logic. The block transfer buffer block (BB) 407 is employed for temporarily storing data exchanged between the bus transaction buffer & control block (TBC) 405 and the word buffer block (WB) 408. In addition, this block has a post write (OEB/IEB) buffer and a bus transaction (OBB/IBB) buffer other than the post write buffer, independently. The OEB/OBB shown in the figure is a transmission buffer, and the IEB/IBB is a reception buffer. These transmission and reception buffers operate at asynchronous transmission and reception clocks generated by PLL in the bit layer block 409, respectively. Since a PCI clock is not used, this buffer is asynchronous with a block in a layer with its higher order than the block transfer buffer block (BB) 407. In addition, this block & word buffer block (BWB) 406 performs checksum generation, error check on a serial bus, and control of re-transmission processing or the like.

On the other hand, the word buffer block (WB) 408 is a buffer for temporarily storing data (block) of its fixed length to be transmitted one by one in units of words from the block transfer buffer block (BB) 407 to the bit layer block (BLB) 409. The OWB shown in the figure is a transmission buffer, and IWB is a reception buffer. These buffers operate at asynchronous transmission and reception clocks generated by PLL in the bit layer block 409, respectively.

The bit layer block (BLB) 409 divides data (word) of its fixed length from the word buffer block (WB) 408 into two sections, and performs serial communication as two-system serial data. The receiving party performs serial to parallel conversion. In addition, this bit layer block (BLB) 409 has transmission and reception PLLs, respectively. The transmission PLL operates based on a predetermined clock (PLCLK), i.e., multiplies by nine and the reception PLL operates based on an LVDS serial reception clock (LVDC_I) transmitted from the secondary PCI serial transfer controller 35 via the LVDS path. The LVDS serial transmission clock (LVDC_O) becomes an output of the same frequency as a PLCLK input.

The Misc information update block (MIS) 410 is a block for handling an interrupt signal (INT [A: D] #) of a PCI bus as Misc information and processing such signal. The serial interrupt synchronization block (SIS) 411 is a block for processing a legacy interrupt signal from an ISA device.

Flow Control

Now, the principle of a flow control for controlling the flow of communication between the OBB/OEB of the transmitting controller and the IBB/IEB of the receiving controller will be described.

As described above, a block buffer hierarchy is expected to serve to transfer information entrusted from the bus transaction buffer accurately and speedily. In order to achieve this, in the flow control method of the present embodiment, both of these two policies are employed in combination.

(1) Achievement of "Accurate Transfer"

The OBB/OEB of the transmitting controller is responsible for information received from a bus transaction buffer. Namely, mere transmission does not mean that an "end" is obtained. The OBB/OEB must not end until it can be verified that information is surely transmitted to and received by the corresponding IBB/IEB of the receiving controller. In addition, transmission must be performed again as required.

The IBB/IEB of the receiving controller is obliged to notify that a block has been received successfully to the OBB/OEB that is a transmission source of the transmitting controller.

This does not mean that processing is ended when the received block is delivered to a bus transaction buffer, but means that notification to the OBB/OEB is required.

This notification is performed by an affirmative response ACK (acknowledgment), specifically a special word called ACKB/ACKE.

The ACKB/ACKE is issued from the IBB/IEB to the OBB/OEB. The same block ID as the received block data is assigned to each ACKB/ACKE. Only one ACKB/ACKE is issued to single block data.

(2) Achievement of "Speedy Transfer"

The OBB_FIFO/OEB_FIFO of the transmitting controller can perform preliminary transmission of block data. Namely, even if ACKB/ACKE is not returned to the previously transmitted OBB/OEB, when another OBB/OEB waiting for transmission is present, transmission of block data from the other OBB/OEB can be started. Block data transmission is executed sequentially without waiting for a return of ACKB/ACKE.

When an arrived block cannot be received by buffer overflow, for example, the IBB_FIFO/IEB_FIFO of the receiving controller notifies the fact to the OBB_FIFO/OEB_FIFO of the transmitting controller.

This notification is performed by a negative response NACK, specifically a special control word called NACKB/NACKE.

The NACKB/NACKE is issued as a re-transmission request from the IBB_FIFO/IEB_FIFO to the OBB_FIFO/OEB_FIFO.

The OBB_FIFO/OEB_FIFO that has received NACKB/NACKE recognizes that a preliminary transmission has failed, and performs proper re-transmission processing. How re-transmission is performed is determined in accordance with a rule between the IBB_FIFO/IEB_FIFO and the OBB_FIFO/OEB_FIFO. In this embodiment, re-transmission processing of block data waiting for ACKB/ACKE from among the transmitted block data is performed in order of block IDS.

OBB State Machine

Now, a state transition of the OBB used in the present embodiment will be described with reference to FIG. 6.

As described previously, there are four OBBs (four stages). Here, a description of the state machine will be given by showing one of these four OBBs.

Figure 6:
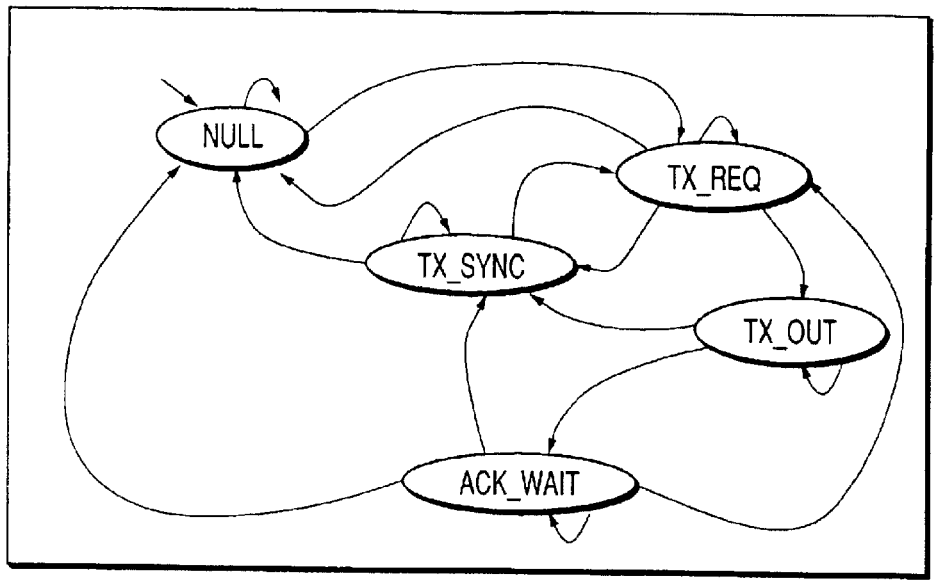
FIG. 6 is a view illustrating a state transition of OBB (Outgoing Block Buffer) used in the present embodiment.

Specifically, the five states as shown in FIG. 6 is defined for OBB.

<NULL>

No entity of block to be transmitted is provided. This state corresponds to the aforementioned "initial state".

<TX_REQ>

An entity of a block to be transmitted has been received from a bus transaction buffer, but transmission is not performed yet. Alternatively, the entity has been transmitted once, but a re-transmission request is received. The system waits until transmission can be performed. This state is a kind of the aforementioned "transmission wait state".

<TX_OUT>

This state corresponding to a state in which block transmission is in progress, and is a kind of "transmission wait state".

<ACK_WAIT>

Transmission of one block is terminated, and the system waits for an ACKB arrival. This state corresponds to the aforementioned "return arrival wait state".

<TX_SYNC>

This state corresponding to a state in which the system waits until error recovery processing has been completed. The state is transited to "initial state" or "transmission wait state" according to the result of error recovery.

Error recovery processing is executed in the case where an error occurs with a communication path between two controllers 15 and 35.

An error denotes an occurrence of an event that cannot be processed in the range of a general flow control protocol. This error is caused by lowered communication reliability due to an external factor such as electrostatic noise. When an error is detected, a block buffer hierarchy cancels normal operation, and performs only error recovery. A time required for one error recovery process is from 10 microseconds to 100 microseconds. This is because it takes long to re-perform frequency synchronization and phase synchronization of the receiving PLL.

An error detecting hierarchy denotes a hierarchy that includes a block buffer hierarchy or lower layer. An occurrence of an error is hidden for a bus transaction buffer. This duration seems if a wait were applied on a bus from the PCI bus side.

Flow Control Model

Figure 7:
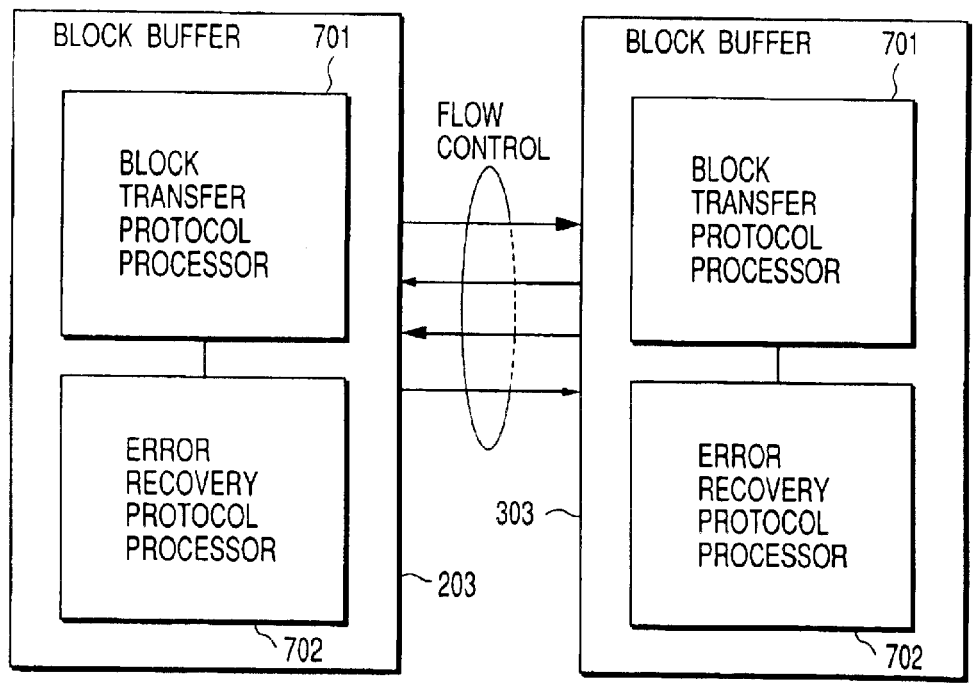
FIG. 7 is a view illustrating a principle of a flow control executed between the primary PCI serial transfer controller and the secondary PCI serial transfer controller according to the present embodiment.

In FIG. 7, there is shown a model of a flow control to be performed between the block transfer buffers 203 and 303. A block transmission protocol state machine 701 and an error recovery processing protocol state machine 702 are provided at the side of the block transfer buffer 203. Similarly, a block transmission protocol state machine 701 and an error recovery processing protocol state machine 702 having their same configurations are provided at the side of the block transfer buffer 303. The block transmission protocol state machine 701 executes flow control protocol processing that includes re-transmission processing. On the other hand, the error recovery processing protocol state machine 702 executes error recovery processing. Two kinds of protocol processors 501 and 502 are thus provided, whereby re-transmission control in the flow control protocol processing can be separated from error recovery processing.

In error recovery processing, as during initialization processing, bit pattern transfer for synchronously establishing a communication path between the controllers 15 and 35 can be started. In order to eliminate logical inconsistency between these controllers, a block ID of the received block data is notified from the receiving party to the transmitting party. Then, transmission of block data is restarted from the next block data of the thus notified, received block data.

Error detection conditions in which the error recovery processing protocol state machine 702 is activated are as follows.

Checksum error (to be detected by the receiving block buffer hierarchy)

Discontinuity of a block ID of ACKB/ACKE (to be detected by the transmitting block buffer hierarchy)

Parity error detection (to be detected by the receiving block buffer hierarchy)

The following conditions are not regarded as an error.

OBB_FIFO/OEB_FIFO has received NACKB/NACKE (This is an event that occurs within the range of a normal flow control protocol. Stated another way, there is no error even if the NACKB/NACKE is received. In this case, re-transmission control is executed.)

Discontinuity of a block ID of a block that arrives at the side of IBB_FIFO/IEB_FIFO (This is an event that occurs within the range of a normal control protocol by re-transmission control for NACKB/NACKE.)

Functional Configuration for Flow Control

Figure 8:
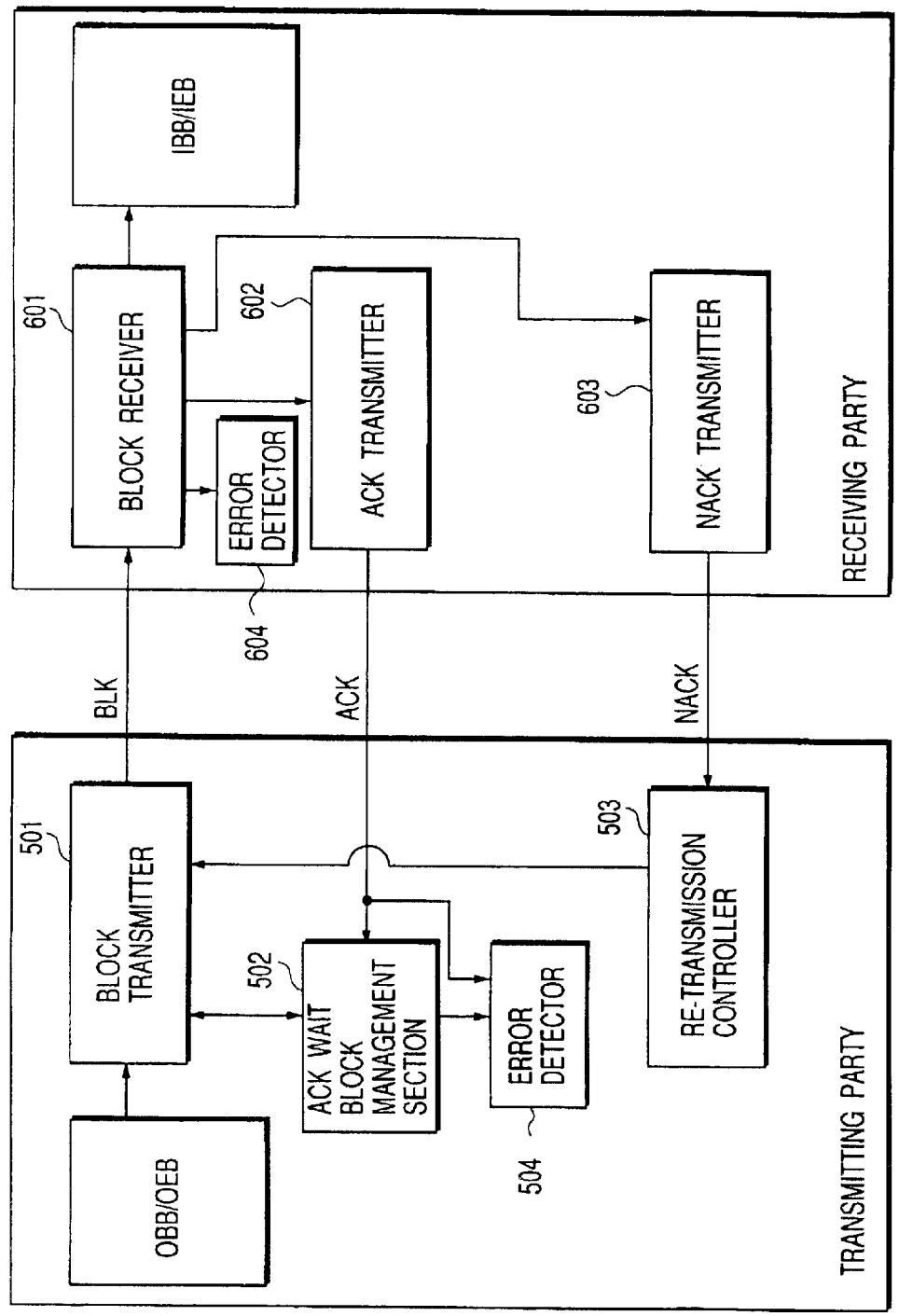
FIG. 8 is a block diagram showing a functional configuration for implementing a flow control according to the present embodiment.

In FIG. 8, there is shown a functional configuration of the transmitting and receiving parties required for flow control protocol processing.

As illustrated, a block transmitter 501, an ACK wait block management section 502, a re-transmission controller 503, and an error detector 504 are provided at the transmitting party. A block receiver 601, an ACK transmitter 602, a NACK transmitter 603, and an error detector 604 are provided at the receiving party. Actually, the functions of both of these transmitting and receiving parties are provided at the block transmission protocol state machine 701 shown in FIG. 7.

The block transmitter 501 assigns a consecutive block ID to each of a plurality of block data targeted for transmission. Then, the block transmitter 501 sequentially transmits a plurality of these block data (BLK) from the transmitting controller to the receiving controller without waiting for return of ACKE/ACKB from the receiving party. The ACK wait block management section 502 is adopted to manage a block in "return arrival wait state" (hereinafter, referred to as an ACK wait block) described in the aforementioned OBB state machine. The section 502 detects whether or not an ACKE/ACKB return from the receiving controller is present by each of the transmitted block data. In the case where the re-transmission controller 503 has received a re-transmission request due to NACKE/NACKB from the receiving controller, re-transmission of the ACK wait block is executed by the block transmitter 501. The error detector 504 detects an occurrence of an error in accordance with whether or not discontinuity of the block ID of ACKE/ACKB is present. If an occurrence of an error is detected, the error recovery protocol processor 502 shown in FIG. 7 is activated.

Such block ID discontinuity includes a case in which a block ID of an arrived ACKE/ACKB block ID does not exist as an ACKE/ACKB wait block as well as a case in which a block ID of the arrived ACKE/ACKB is discontinuous.

The block receiver 601 receives block data from the block transmitter 501, and stores the data in IBB/IEB. The ACK transmitter 602 transmits the ACKE/ACKB having the same block ID as the block ID of the received block data assigned thereto from the receiving controller to the transmitting controller every time block data is normally received. The NACK transmitter 603 transmits NACKE/NACKB to the transmitting controller when block data transmitted from the transmitting controller cannot be received by the receiving controller or when a block ID of the received block data is discontinuous. The error detector 604 detects an occurrence of an error in accordance with whether or not a parity error or checksum error is present. If an occurrence of an error is detected, the error recovery protocol processor 502 shown in FIG. 7 is activated.

Block Transfer & Re-Transmission Control (Example 1)

Now, a flow control operation (block transfer & re-transmission control) executed between the primary PCI serial transfer controller 15 and the secondary PCI serial transfer controller 35 will be described with reference to FIG. 9.

Here, the primary PCI serial transfer controller 15 is defined as a transmitting controller, and the secondary PCI serial transfer controller 35 is defined as a receiving controller.

In the transmitting controller, a consecutive block ID is assigned to each of a plurality of block data waiting for transmission, and preliminary transmission of a plurality of these blocks is performed. In FIG. 9, there is shown a case in which preliminary transmission of four blocks from block BLK#0 to block BLK#3 is performed. After preliminary transmission of these four blocks, transmission of the next block is performed every time ACK is returned from the receiving controller. In this manner, a maximum of four ACK wait blocks is present, and a block ID can prevent an occurrence of logical inconsistency between these controllers, even if the ID is 3-bit.

When the receiving controller normally receives the first block BLK#0, ACK (ACK#0) of a block ID=#0 is returned. When ACK#0 arrives, the OBB/OEB which stores the block BLK#0 is transited from an ACK wait state to an initial state in the transmitting controller, and three blocks BLK#1 to BLK#3 are the ACK wait block data. Then, preliminary transmission of the next block BLK#4 waiting for transmission is started.

When the receiving controller normally receives the block BLK#1, ACK (ACK#1) of block ID=#1 is returned. When ACK#1 arrives, the OBB/OEB which stores the block BLK#1 is transited from an ACK wait state to an initial state in the transmitting controller, and three blocks BLK#2 to BLK#4 are the ACK wait block data. Then, transmission of the next block BLK#4 waiting for transmission is started.

Actually, the returning of ACK#0 or ACK#0 and ACK#1 is performed before preliminary transmission processing of all the blocks BLK#0 to BLK#3 terminates. Thus, transmission of the blocks BLK#4 and BLK#5 is consecutively performed after preliminary transmission processing.

In the case where an IBB/IEB buffer of the receiving controller overflows or in the case where discontinuity occurs with a block ID up to the block BLK#5, the receiving control cannot receive a block BLK#5. In this case, NACK (NACKB/NACKE) is transmitted to the transmitting controller.

When NACK arrives, the transmitting controller detects an ACK wait block, namely, the OBB/OEB in the "return arrival wait state". In this example, ACK#0 and ACK#1 has already arrived, and thus, ACK wait blocks are blocks BLK#2 to BLK#5. Then, the transmitting controller starts retransmission of the ACK wait block. This re-transmission processing is executed by preliminary transmission processing from the first block BLK#2 of an ACK wait. Specifically, the following procedures are executed.

(1) If there is a block in the middle of transmission (during transmission) when OBB_FIFO/OEB_FIFO receives NACKB/NACKE, such block only is transmitted (TX_OUT).

(2) All states of OBB/OEBs that enters an ACKB/ACKE wait (ACK_WAIT) are changed to transmission wait (TX_REQ). Then, the OBB/OEBs in transmission wait sequentially performs transmission (TX_OUT).

After this re-transmission processing, when the receiving controller receives a block BLK#2, and returns ACK#2, transmission of the block BLK#6 waiting for the next transmission is started.

In this manner, in the flow control of the present embodiment, a block ID is assigned in both of block data transmission from the transmitting party to the receiving party and ACK return from the receiving party to the transmitting party, thus making it possible to asynchronously perform block data transmission and an ACK return. By this mechanism, preliminary transmission of block data from the transmitting party to the receiving party is achieved. Further, the transmitting party can determine which data item is the last the receiving party has received. Thus, for example, the case where the receiving party cannot receive data due to a buffer overflow on the receiving buffer, data that is not received can be re-transmitted correctly. Hence, improvement in communication speed can be made compatible with improvement in reliability.

When NACKB/NACKE has received, it is possible to use a method in which all the OBB/OEBs waiting for transmission are transmitted, and then, re-transmission is restarted.

Block Transfer & Re-Transmission Control (Example 2)

Now, a second example of a flow control operation (block transfer & re-transmission control) executed between the primary PCI serial transfer controller 15 and the secondary PCI serial transfer controller 35 will be described with reference to FIG. 10.

In this example, there is shown a system in which blocks are repeatedly transmitted irrespective of NACKB/NACKE. That is, OBB_FIFO/OEB_FIFO performs repetitive transmission sequentially of the OBB/OEB waiting for ACKB/ACKE as well as the OBB/OEB waiting for transmission. There is no need to issue NACKB/NACKE at the side of IBB_FIFO/IEB_FIFO. In this manner, control becomes very simple.

IBB_FIFO/IEB_FIFO causes IBB/IEB to receive an arrived block at its own convenience. When the IBB/IEB receives a block correctly, it notified the fact to the OBB/OEB by issuing ACKB/ACKE with its block ID.

Figure 9:
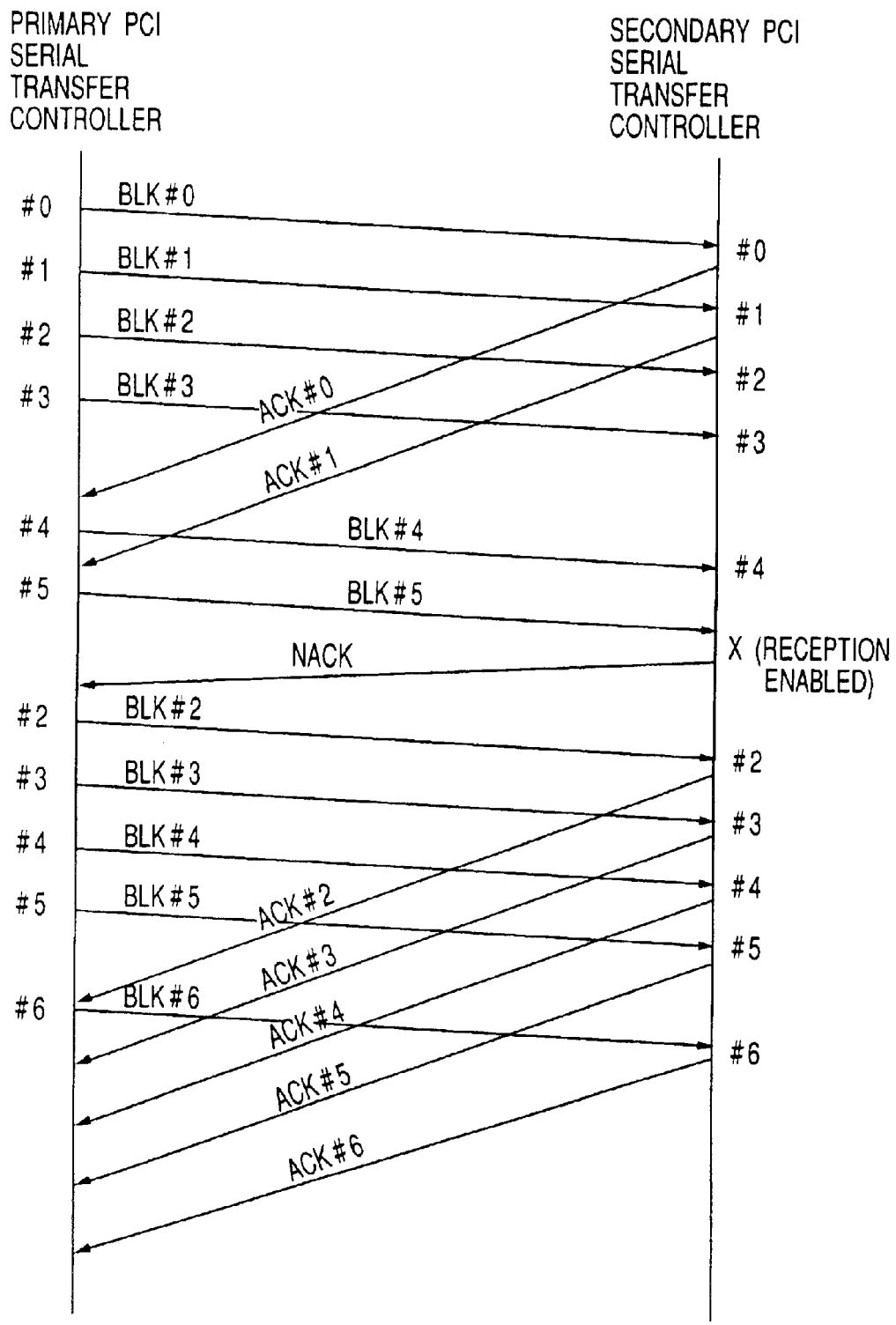
FIG. 9 is a view showing procedures for flow control operation in the present embodiment.
Figure 10:
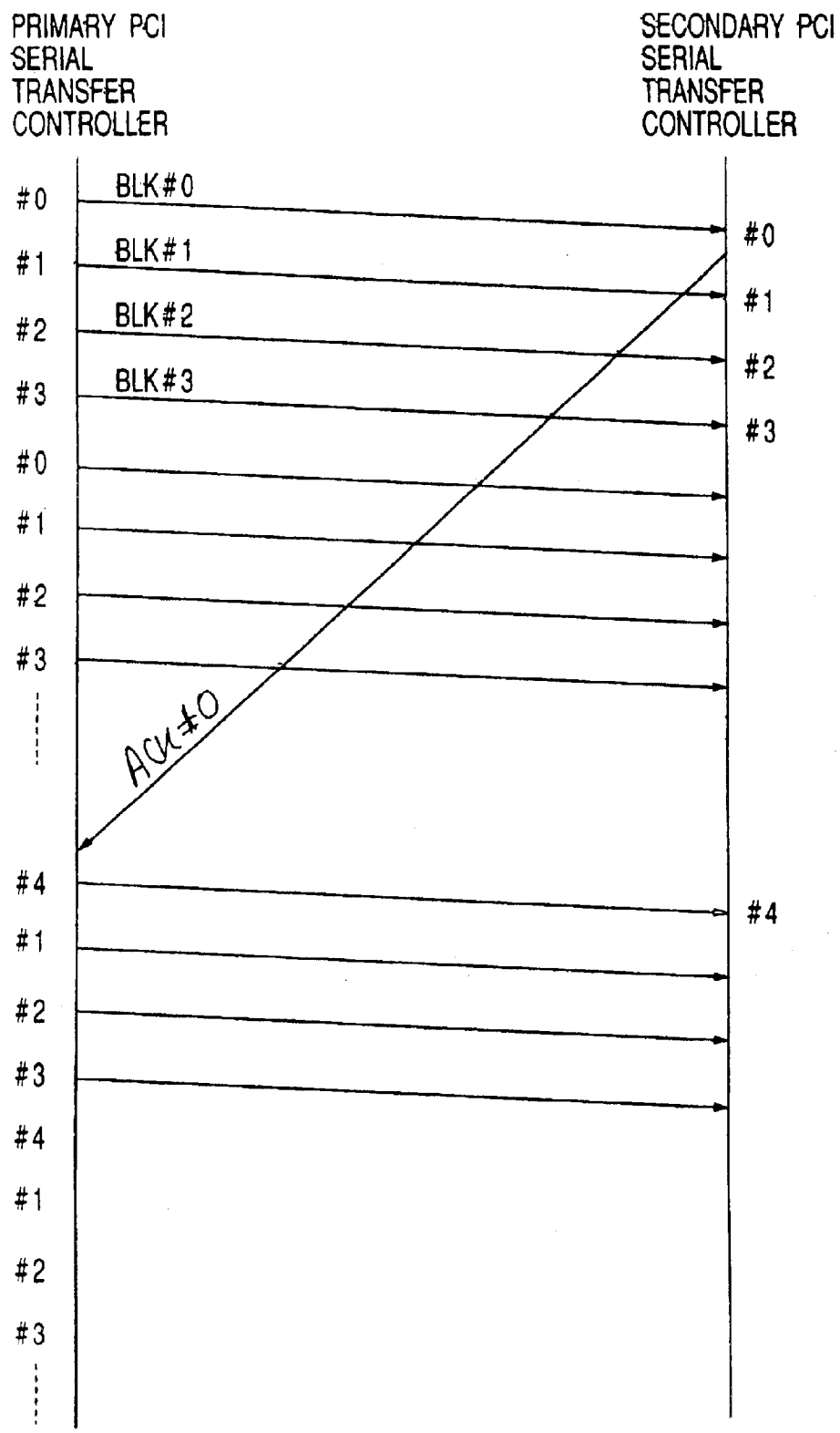
FIG. 10 is a view showing second procedures for flow control operation in the present embodiment.

In an example shown in FIG. 10, as is the case with FIG. 9 described previously, preliminary transmission of four blocks from block BLK#0 to block BLK#3 is first performed. Consecutive block IDs are assigned to these blocks. After preliminary transmission of these four blocks, these preliminary transmitted blocks BLK#0 to BLK#3 are blocks waiting for ACK. The transmitting controller repeatedly executes consecutive transmission of blocks BLK#0 to BLK#3 waiting for ACK until ACK has been returned from the receiving controller.

When the receiving controller has received a first block BLK#0 normally, ACK (ACK#0) of block ID=#0 is returned. When ACK#0 arrives, the OBB/OEB which stores block BLK#0 is transited from an ACK wait state to an initial state in the transmitting controller, and three blocks BLK#1 to BLK#3 are the block data waiting ACK. Then, four blocks composed of a block BLK#4 waiting for the next transmission and the remaining three blocks BLK#1 to BLK#3 waiting for ACK are consecutively and preliminarily transmitted. Consecutive transmission of BLK#4, BLK#1, BLK#2, and BLK#3 is repeatedly executed until the next ACK has been returned from the receiving controller.

The receiving controller may receive BLK#2, BLK#3, and BLK#4 in order at an arbitrary timing. Hence, a re-transmission request caused by NACKB/NACKE is not issued.

When the receiving controller normally receives a block BLK#1, and ACK (ACK#1) of block ID=#1 is returned, consecutive transmission of BLK#5, BLK#2, BLK#3, and BLK#4 is repeatedly performed. In this way, consecutive transmission is repeatedly performed in units of four blocks while updating a combination of four blocks consecutively transmitted so that a new block waiting for transmission can be assigned.

Such repetitive transmission system can be easily achieved merely by repeatedly performing preliminary transmission of blocks waiting for ACK as well as blocks waiting for transmission in a predetermined plurality of units.

Error Recovery Processing

Figure 11:
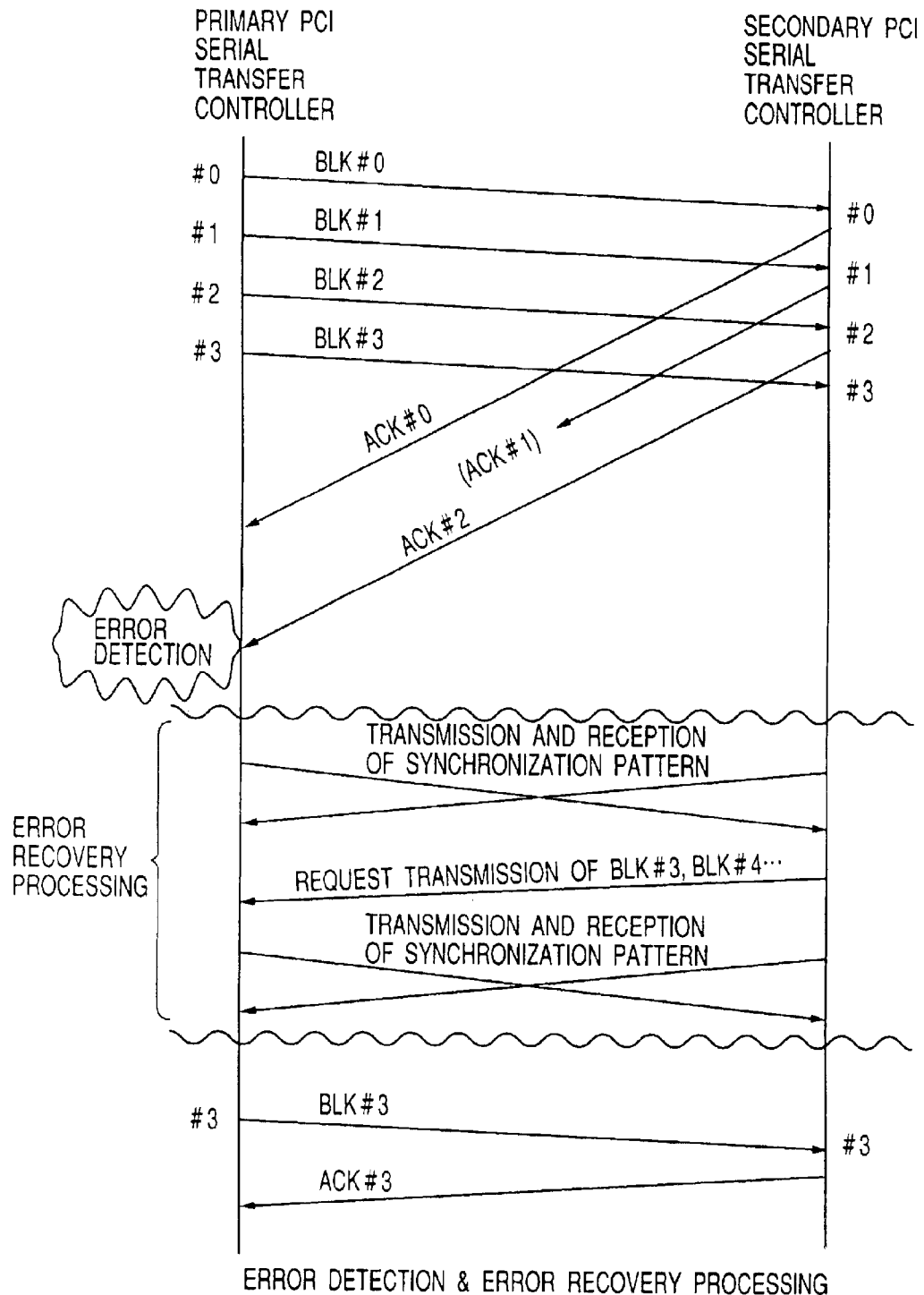
FIG. 11 is a view showing procedures for error recovery processing in the present embodiment.

Now, error recovery processing executed in the case where an error occurs during block transfer between the primary PCI serial transfer controller 15 and the secondary PCI serial transfer controller 35 will be described with reference to FIG. 11.

Here, assume a case in which ACKB/ACKE from the receiving controller is lost while block transfer is performed in accordance with the procedures shown in FIG. 9 or FIG. 10. That is, as illustrated, although the receiving controller returns ACK#0, ACK#1, and ACK#2 every time it receives BLK#0, BLK#1, and BLK#2, respectively, in the case where ACK#1 is lost for any reason during the process, ACK#2 followed by ACK#0 arrives at the transmitting controller. Due to this ACK discontinuity, the transmitting controller detects an occurrence of an error, cancels normal flow control operation, and goes to error recovery protocol processing.

In accordance with an instruction from a controller (herein, transmitting controller) that has detected an error, the other controller (herein, receiving controller) also goes to error recovery protocol processing. Error recovery protocol processing is composed of two phases, i.e., a physical synchronization recovery phase and a logical synchronization recovery phase. In the physical synchronization recovery phase, transmission of a predetermined synchronization bit pattern is repeatedly executed many times between two controllers. The predetermined synchronization bit pattern is transmitted to be included in a dedicated control word. When these two controllers enters a state in which physical synchronization is established, and conditions in which serial data transfer between these two controllers including PLL synchronization can be normally performed are met, the receiving controller notifies information indicative of how many blocks has been normally received, by the dedicated control word. In this manner, a block in which the receiving controller returns ACK logically coincides with a block in which the transmitting controller checks an ACK arrival. Then, after information communication has been performed for notifying that an error recovery state has been established, the transmitting controller and the receiving controller return a general flow control protocol together.

The transmitting controller restarts transmission from the block BLK#3 next to the reception completion block BLK#2, BLK#3 being notified by the receiving controller. It is possible for the receiving controller to inform the transmitting controller of the reception completion block BLK#2 and the transmitting controller restarts transmission from the next block BLK#3 of the reception completion block BLK#2.

As has been described above, for an ACK loss, recovery for a normal state can be performed by employing re-transmission control and error recovery control. Recovery for a normal state can be performed in the similar manner for a block loss and a NACK loss.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, in the present embodiment, although two controllers configuring a bridge are separately disposed at the PC 100 and the docking station 200, respectively, for example, in the case where a first expansion unit is connected to the PC 100, and a second expansion unit is further connected thereto via the first expansion unit, the PC 100 and the first expansion unit function as a host device from the standpoint of the second expansion unit. In this case, the primary PCI serial transfer controller 15 and the secondary PCI serial transfer controller 35 may be provided to be dispersed at the first expansion unit and the second expansion unit, respectively.

In addition, an ID is assigned to each block for the purpose of management. The size of blocks may be arbitrary.

It is possible to implement both control flow examples shown in FIGS. 9 and 10 in a single embodiment and selectively performs one of them based on a state of the bus, such as an error rate of the bus. Even though some structural elements are removed from all the structural elements described in the embodiment, when the object of the present invention can be solved, and when the effect of the present invention can be obtained, the configuration from which the structural elements are removed can be extracted as the invention.

As has been described above, according to the present invention, data required to transmit a bus transaction between buses can be transferred accurately and speedily between two controllers, thus making it possible to ensure sufficient throughput and to improve operational reliability. In particular, the present invention is applied to serial transfer between physically different two controllers that logically operate as a single bus bridge, whereby serial connection between a host device and an expansion unit can be achieved while maintaining operational reliability and performance of the bus bridge.

What is claimed is:

1. An apparatus comprising:
a transmitter that serially transmits data with a predetermined size to a receiver, the data having an identifier number and an error check data, the transmitter repeatedly transmitting the data without waiting for a response from the receiver;
an error detector, coupled to the transmitter, which detects a link error when the transmitted data is not received by the receiver;
a process unit that sets the transmitter to an error recovery state when the link error is detected; and
a buffer, coupled to the transmitter, which stores the transmitted data that is not received by the receiver, and wherein the transmitter transmits first predetermined bit pattern data to the receiver when the transmitter is in the error recovery state, transmits second predetermined bit pattern data to the receiver after receiving a response of the first predetermined bit pattern data from the receiver, and transmits the data stored in the buffer when a link error is recovered.

2. A data transfer apparatus comprising:
a first controller that transmits a predetermined number of blocks of data to a second controller without waiting for an acknowledgment from the second controller, the transmitted blocks of data having consecutive identifier numbers;
a response unit that transmits from the second controller to the first controller the acknowledgement when the second controller correctly receives a block of data and a re-transmission request when the second controller does not correctly receive a block of data, the acknowledgment having the identifier number of the received block of data, the re-transmission request having no identifier number;
a manager that detects an identifier number of the latest acknowledgement,
wherein the first controller, when the acknowledgment is received, transmits to the second controller another block of data having an identifier number that follows the identifier number of the latest block of data transmitted from the first transmitter, and
when the re-transmission request is received, transmits to the second controller a block of data having an identifier number that follows the identifier number of the latest acknowledgement.

3. The apparatus according to claim 2, wherein a configuration of the first controller is the same as a configuration of the second controller.

4. The apparatus according to claim 2, wherein the first controller and the second controller have respective configuration registers.

5. A data transfer apparatus in which data required to transmit a bus transaction is transmitted between first and second controllers respectively connected to first and second buses, the data transfer apparatus comprising:
a transmitter that repeatedly transmits a predetermined number of blocks of data from the first controller to the second controller without waiting for a response from the second controller, the transmitted blocks of data having consecutive identifier numbers;
a response unit that transmits from the second controller to the first controller the response when the second controller correctly receives a block of data, the response having the identifier number of the received block of data;
a manager that detects the identifier number of the latest response; and
a transmission controller that makes the transmitter stop repeatedly transmitting the predetermined number of blocks of data and instead repeatedly transmits another predetermined number of blocks of data from the first controller to the second controller without waiting for a response from the second controller, the another predetermined number of blocks of data including blocks of data having identifier numbers that follow the identifier number of the latest response.

6. The apparatus according to claim 5, wherein the first controller and the second controller have the same configuration.

7. The apparatus according to claim 5, wherein the first controller and the second controller have respective configuration registers.

8. A data transfer apparatus in which data required to transmit a bus transaction is transmitted between first and second controllers respectively connected to first and second buses, the data transfer apparatus comprising:
a first transmitter that transmits a predetermined number of blocks of data from the first controller to the second controller without waiting for a response from the second controller, the transmitted blocks of data having consecutive identifier numbers;
a response unit that transmits from the second controller to the first controller the response when the second controller correctly receives a block of data, the response having the identifier number of the received block of data;
an error detector that detects a link error between the first controller and the second controller when the first controller receives the responses having nonconsecutive identifier numbers;
an error recovery processing unit that repeatedly exchanges a predetermined bit pattern between the first controller and the second controller and transmits from the second controller to the first controller a re-transmission request requesting re-transmission of a block of data that is not correctly received by the second controller when a condition in which a serial data transfer between the first controller and the second controller is met; and
a second transmitter that re-transmits a block of data from the first controller to the second controller which is requested by the re-transmission request.

9. The apparatus according to claim 8, wherein the first controller and the second controller have the same configuration.

10. The apparatus according to claim 8, wherein the first controller and the second controller have respective configuration registers.

* * * * *